United States Patent
Mili et al.

(10) Patent No.: US 8,857,595 B2
(45) Date of Patent: *Oct. 14, 2014

(54) LOAD TORQUE LOCK AND APPARATUS HAVING LOAD TORQUE LOCK

(75) Inventors: Mohamed Mili, Ettlingen (DE); Tarek Mili, Karlsruhe (DE); Christian Bauer, Lauf (DE); Hans-Peter Dommsch, Lichtenau (DE); Peter Bohr, Karlsruhe (DE); Thomas Holzer, Shanghai (CN); Holger Thoene, Rastatt (DE)

(73) Assignee: Robert Bosch GmbH, Stuttgart (DE)

(*) Notice: Subject to any disclaimer, the term of this patent is extended or adjusted under 35 U.S.C. 154(b) by 567 days.

This patent is subject to a terminal disclaimer.

(21) Appl. No.: 13/147,064

(22) PCT Filed: Jan. 27, 2010

(86) PCT No.: PCT/EP2010/050885
§ 371 (c)(1), (2), (4) Date: Mar. 12, 2012

(87) PCT Pub. No.: WO2010/089232
PCT Pub. Date: Aug. 12, 2010

(65) Prior Publication Data
US 2012/0152690 A1    Jun. 21, 2012

(30) Foreign Application Priority Data

Feb. 3, 2009 (DE) .......................... 10 2009 000 563
Jan. 27, 2010 (DE) .......................... 10 2010 001 245

(51) Int. Cl.
*F16D 41/20* (2006.01)
*E05F 11/50* (2006.01)

(52) U.S. Cl.
CPC ........... *F16D 41/206* (2013.01); *E05Y 2900/55* (2013.01); *E05F 11/505* (2013.01)
USPC ..................................................... 192/223.4

(58) Field of Classification Search
CPC ........ F16D 41/206; F16D 49/02; F16D 51/04
USPC ..................................... 192/223.4; 188/77 W
See application file for complete search history.

(56) References Cited

U.S. PATENT DOCUMENTS 1,877,288 A * 9/1932 Field .......................... 192/223.4
4,646,888 A * 3/1987 Higuchi et al. ............ 192/223.4
(Continued)

FOREIGN PATENT DOCUMENTS

DE    19753106 A1    5/2000
JP    59-29822 A     2/1984

OTHER PUBLICATIONS

PCT/EP2010/050885 International Search Report dated Apr. 26, 2010.

(Continued)

*Primary Examiner* — Richard M. Lorence
(74) *Attorney, Agent, or Firm* — Michael Best & Friedrich LLP (57) ABSTRACT

The invention relates to a load torque lock (1) comprising a sling element (12) that frictionally interacts with a brake component (13) for blocking a torque, and a drive wheel (14) that is coupled in a torque transferring manner to a carrier (15; 15a) having at least one contact area (25) to the sling element (12) and engaging axially in the drive wheel (14), by means of which a torque to be blocked can be initiated in the sling element (12). According to the invention, the carrier (15; 15a) has means for reducing the bending tension in the at least one contact region (25).

13 Claims, 7 Drawing Sheets

(56) References Cited

U.S. PATENT DOCUMENTS

| | | | |
|---|---|---|---|
| 4,651,854 A | * | 3/1987 | Harada .................. 192/223.4 |
| 4,926,987 A | | 5/1990 | Honma |
| 5,328,007 A | | 7/1994 | Yokozuka et al. |
| 2013/0105270 A1 | * | 5/2013 | Mili et al. .................. 192/41 S |

OTHER PUBLICATIONS

Tooten, K. "Optimierung der Schlingbandfeder in einer Lastmomentsperre," Antriebstechnik, Vereinigte Fachverlage, Mainz, DE, Jan. 1, 1996, XP000548141 (Original and English Translation—10 pages).

* cited by examiner

LOAD TORQUE LOCK AND APPARATUS HAVING LOAD TORQUE LOCK

BACKGROUND OF THE INVENTION

The invention relates to a load torque lock, in particular for automotive applications, and to an apparatus, in particular an auxiliary and comfort apparatus, preferably for automotive applications, having a load torque lock.

Known from DE 197 53 106 C2 is a load torque lock which is incorporated in a drive train and which automatically blocks torques induced by the output drive when the drive is at a standstill. The torques induced from the drive side are transmitted in both directions. In order to block the torque on the output side a sling spring interacts frictionally with a brake component. The known load torque lock has proved effective. However, efforts are being made to make the load torque lock more robust, since deformations of the plastics material can occur, in particular in the contact region of the sling spring with the plastics carrier, which deformations are caused by surface pressures arising in operation and by relatively high bending stresses.

SUMMARY OF THE INVENTION

It is therefore the object of the invention to specify a robust load torque lock which has an increased service life. The load torque lock should preferably be inexpensive to produce and, further preferably, should be of lightweight construction. It is also the object of the invention to specify an apparatus having a correspondingly optimized load torque lock.

The invention is based on the concept of equipping the at least one contact region of the carrier, against which the sling element bears or is supported in the event of blocking, with means which bring about a reduction of the bending stress in the at least one contact region.

Especially preferred is an embodiment in which two contact regions of the carrier, which each interact with a respective free end of the sling element, are made at least partially of metal. By making the at least one contact region of the carrier at least partially of metal, inadmissible surface pressures and high bending stress can be avoided, whereby damage to the carrier when a torque to be blocked is induced can be reliably prevented.

A load torque lock configured according to the concept of the invention is especially suited to automotive applications such as sliding roof drives, seat adjusters, window regulators, windshield wiper drives, transmission and clutch actuators and electric steering systems, and for use in actuators generally. However, the application of a load torque lock configured according to the concept of the invention is not restricted hereto and can be used in principle in all motors, drives and machines.

Very especially preferred is an embodiment of the load torque lock in which the carrier coupled to the drive wheel, preferably by axial engagement, has a multi-part configuration, preferably such that it comprises a plastics main body to which at least one metal element is fixed to form at least one contact region. Very especially preferably, the carrier or main body is a plastics injection molding. The multi-part configuration of the carrier (plastics and metal protection) makes it possible to distribute the contact pressure on the sling element in such a manner that the main body of plastics material withstands the loadings and, overall, a system which can be produced at low cost is obtained.

With regard to the manner in which the at least one metal element is fixed to the plastics portion of the carrier, preferably to a main body of the carrier, there are various possibilities. For example, it is possible to inject a plastics injection molding compound partially around the metal element during the injection molding process and to fix the metal element in this way. In an alternative configuration, the metal element may be latched or clipped to the plastics portion and may subsequently be fastened thereto in a simple manner.

With regard to the configuration of the metal element there are also various possibilities. For example, it is possible to configure the metal element as a shell or as a pot closed on one side, in particular at the bottom, and to arrange the metal element in such a manner that it at least partially covers or encloses the plastics portion. It is also possible to configure the metal element in such a manner that the plastics material of the carrier is injected at least partially around the metal element.

Furthermore, there are also various possibilities with regard to the concrete configuration of the sling element. Especially preferred is an embodiment in which the sling element is in the form of an, in particular metal, sling spring, the sling spring preferably interacting, by means of two preferably inwardly bent, axially spaced free ends, with respective metal contact regions of the carrier. Alternative embodiments of the sling element are also possible, for example as a sling link chain, a sling strap, a sling cable or the like. The sling element is preferably arranged in such a manner that its free ends can be moved towards and away from one another in the circumferential direction in order to bring the sling element frictionally into frictional engagement with the brake component on the radially inner side or the radially outer side in the event of blocking.

There are also various possibilities with regard to the configuration of the brake component. It is especially preferred if the brake component has a cylindrical friction surface (inner or outer cylindrical surface), it being possible to implement both an embodiment in which the sling element interacts with the inner circumference of the brake component, that is, with a friction surface formed on the inner circumference, and an embodiment in which the sling element surrounds the brake component and in this case interacts frictionally by frictional engagement with an outer circumference of the brake component in the event of blocking.

The invention also leads to an apparatus, preferably an auxiliary or comfort apparatus, in particular for automotive applications. The apparatus may be, for example, a motor and/or a machine. Very especially preferably, it is an actuating drive, such as a sliding roof drive, a window regulator drive, a seat adjuster drive, a windshield wiper drive or a transmission and/or clutch actuator. It may also apply to an electric steering system for motor vehicles, etc. The apparatus is distinguished in that it is provided with at least one load torque lock configured according to the concept of the invention.

BRIEF DESCRIPTION OF THE DRAWINGS

Further advantages, features and details of the invention are apparent from the following description of preferred exemplary embodiments and with reference to the drawings, in which.

DETAILED DESCRIPTION

In the figures, identical elements and elements having the same function are designated by the same reference numerals.

Figure 1:
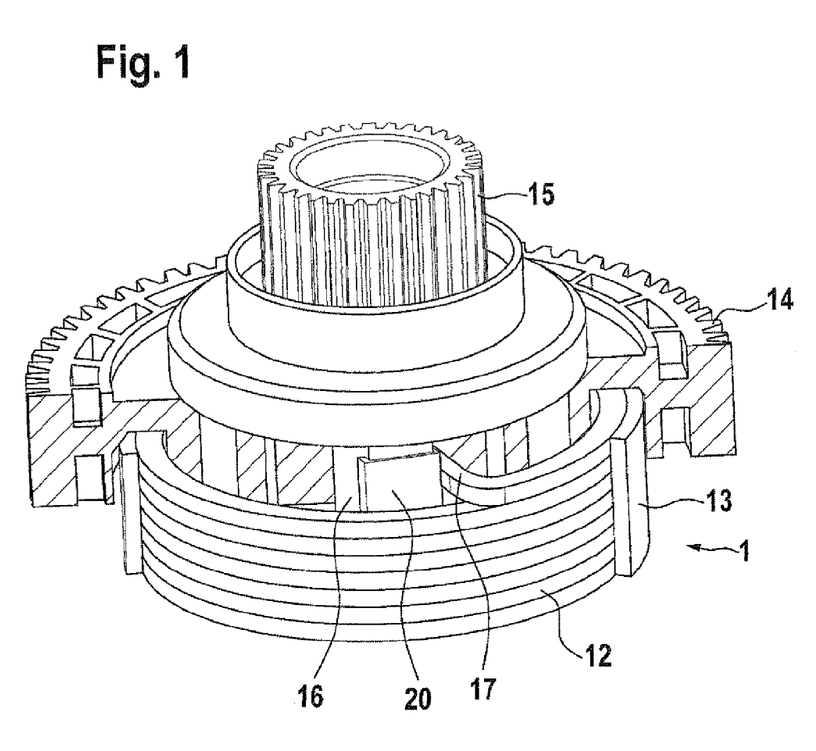
FIG. 1 shows in a perspective, partly sectional representation a possible embodiment of a load torque lock (locking coupling)

FIG. 1 shows a possible embodiment of a permanently coupled, that is, non-disengageable load torque lock 1. This includes a sling element 12 in the form of a metal sling spring. The sling element 12 is received in a hollow-cylindrical brake component 13 and, in the event of blocking, interacts by means of its outer circumference with the inner circumferential surface of the brake component 13. In an alternative variant, which is known per se and is not represented, the sling element 12 interacts by means of its inner circumference with the preferably cylindrical outer circumference of a brake component.

The load torque lock 1 includes a drive wheel 14 in the form of a worm gear which is drivable in both directions of rotation by an electric-motor driven transmission worm (not shown). The drive wheel 14 is coupled to a carrier 15 which engages in the axial direction in receiving pockets 16 of the drive wheel 14. The carrier 15 serves in its turn to transmit the torque induced on the drive side to an adjusting mechanism, for example a cable control mechanism of a window regulator drive.

The sling element 12 has two free ends spaced from one another in the axial direction, of which only an upper, radially inwardly bent free end 17 is shown in FIG. 1. The drive wheel 14 interacts with the carrier 15 in such a way that if a torque is induced on the drive side, that is, by the drive wheel 14, it is transmitted to the carrier 15. The sling element 12 is then entrained, that is, it is displaced together with the drive wheel 14 and the carrier 15 relative to the fixed brake component 13. In the event that torque is induced on the output side, that is, via the carrier 15, the free ends 17 of the sling element 12 are moved apart in such a manner that the outer circumference of the sling element 12 is increased, whereby the sling element 12 interacts frictionally by means of its outer circumference with the inner circumference of the brake component 13, and thus blocks the torque induced on the output side, which torque, therefore, is not transmitted to the drive wheel 14 and thus in the direction of a drive motor, in particular of an electric motor (not shown).

In a variant (not shown) of a load torque lock 1 in which the sling element 12 interacts with an outer circumference of a brake component 13, the free ends 17 must be moved with respect to one another as described previously, but in the reverse direction, in order to produce the braking effect.

In order to increase the robustness of the load torque lock 1, a metal element 20 is provided on each axial projection 18 (only one is shown) by means of which the carrier 15 engages axially in the receiving pockets 16, against which metal element 20 a respective free end 17 of the sling element 12 bears in order to block the torque induced on the output side.

In the following description a first preferred embodiment of the multi-part carrier 15 is explained in detail with reference to the perspective representations in FIG. 2 to FIG. 4.

Figure 2:
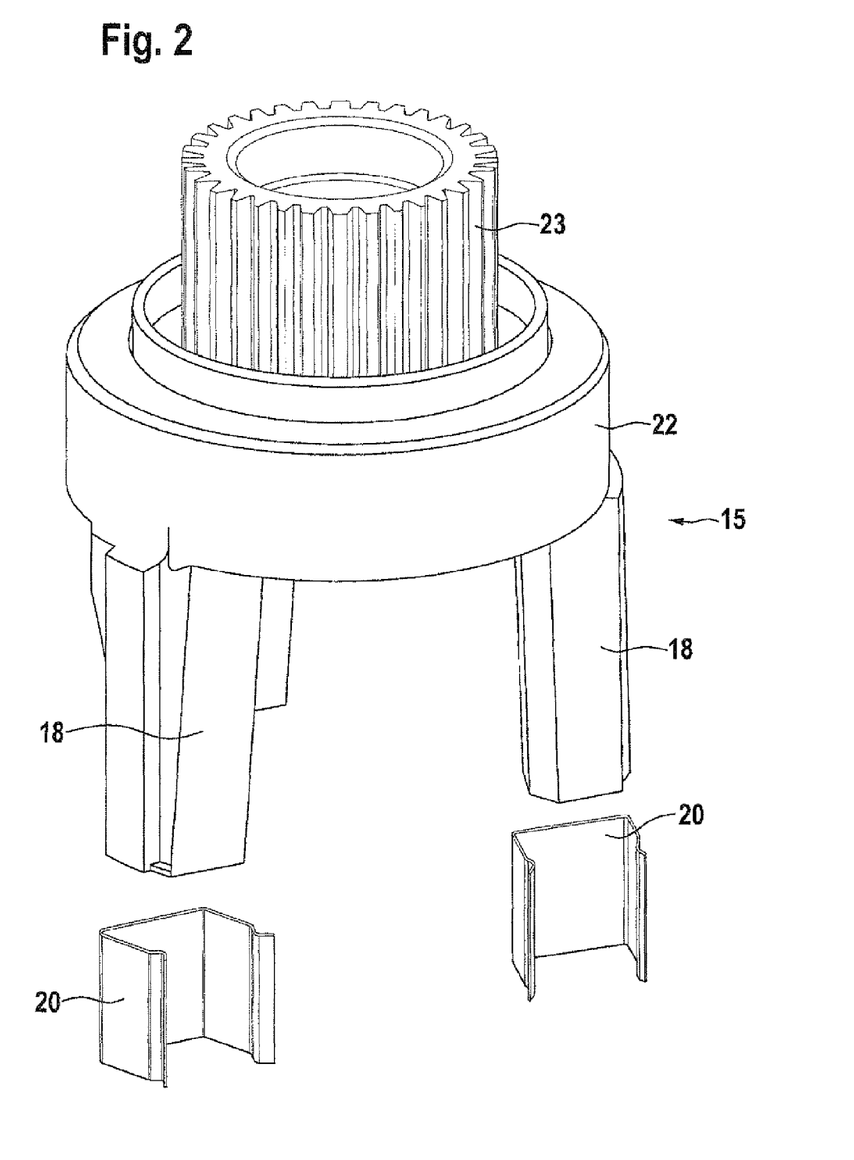
FIG. 2 is an exploded representation of a carrier consisting of a plastics main body and two clip-on metal elements.

FIG. 2 shows in a perspective representation the carrier 15 of multi-part construction. This carrier 15 includes a main body 22 of plastics material produced as an injection molding. In an upper portion the main body 22 is provided with an external toothing 23 in order to transmit, for example to a cable control mechanism, the torque transmitted by the drive wheel 14 (see FIG. 1) to the carrier 15.

The carrier 15, more precisely the main body 22, has two peg-like projections 18 spaced from one another by 180° in the circumferential direction, which serve to transmit torque, on the one hand imparting a torque induced on the output side to the sling element 12 as shown in FIG. 1 and, on the other, receiving a torque induced on the drive side via the drive wheel 14 (see FIG. 1).

The carrier 15 further includes two clip-on metal elements 20 to be fixed to the projections 18 for the purpose of increasing the robustness of the multi-part carrier 15. Contrary to the prior art, the free ends 17 of the sling element 12 do not bear directly on the projections 18, but only indirectly thereon via the metal elements 20, which interact immediately, that is, directly, with the free ends 17 of the sling element 12.

Figure 3:
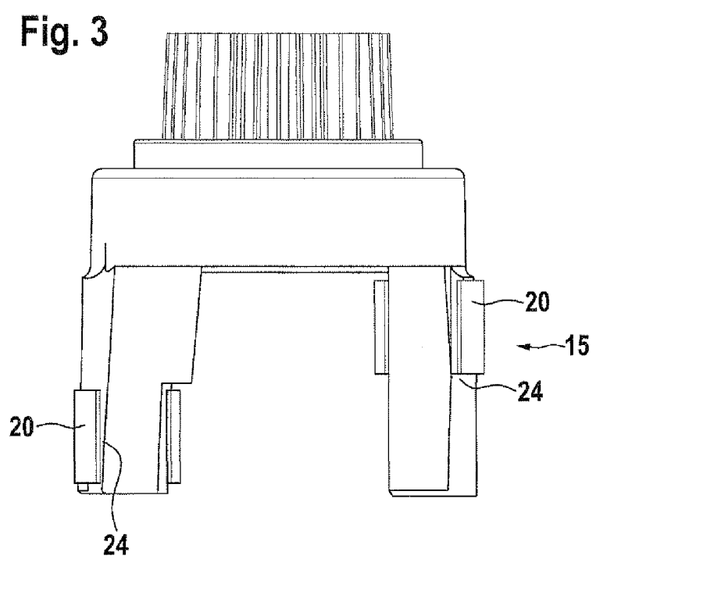
FIG. 3 is a side view of a fully assembled carrier.
Figure 4:
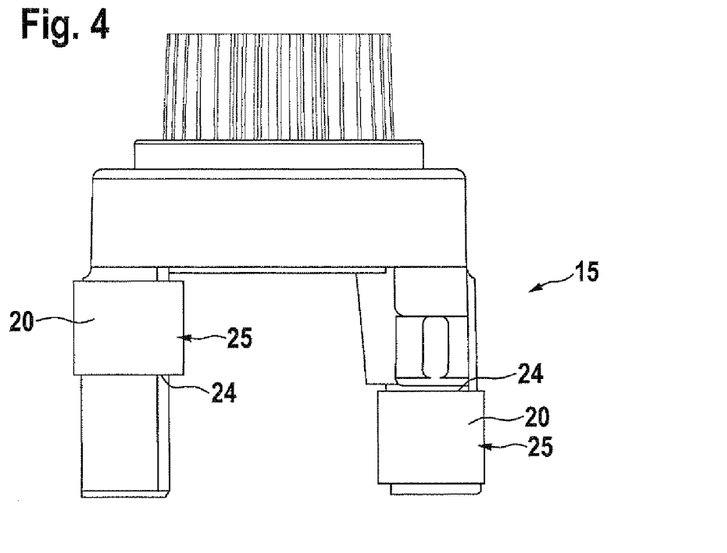
FIG. 4 is a side view of the assembled carrier rotated through 180° in relation to FIG. 3.

In FIG. 3 and FIG. 4 the carrier 15 is in each case represented in the fully assembled state. It can be seen that the metal elements 20 are arranged offset to one another in the axial direction. This is explained by the fact that the free ends 17 of the sling element 12, in the form of a sling spring, are also spaced from one another in the axial direction.

The metal elements 20 each encompass a plastics portion 24 of the main body 22 formed by a respective portion of the projection.

As is apparent from FIG. 4, the metal elements 20 on a common side each form a contact region 25 for direct abutment against a respective free end 17 of the sling element 12. In this way inadmissible surface pressures, of the kind which might occur in the event of blocking with purely plastics projections 18, can be reliably avoided. Furthermore, the metal elements 20 reduce the bending stresses in the projections 18, in that the forces exerted by the free ends 17 are imparted over a larger area to the projections 18.

Figure 5:
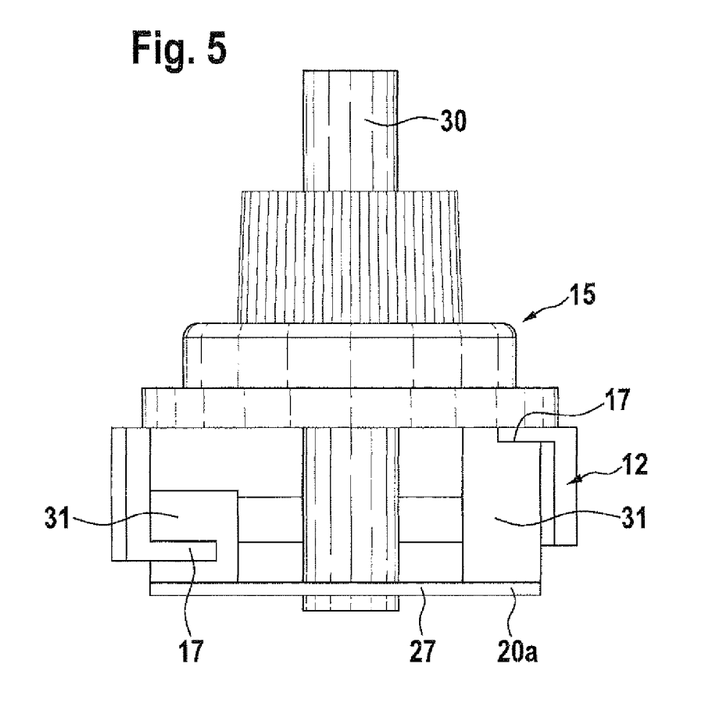
FIG. 5 shows a part of the load torque lock in a partially sectional perspective view with a modified metal element.
Figure 6:
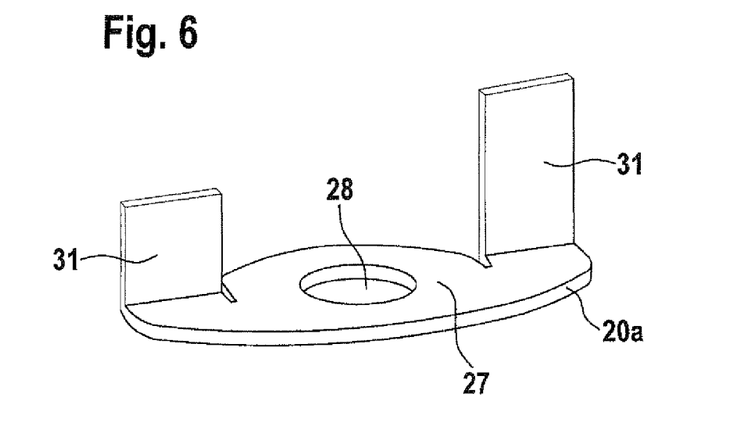
FIG. 6 shows the metal element according to FIG. 5 in a perspective view.

FIGS. 5 and 6 show a modified metal element 20a. The metal element 20a has a plate-like middle region 27 with a through-opening 28. The metal element 20a is mounted on a drive pin 30 of the carrier 15 by means of the through-opening 28. The middle region 27 is arranged in a plane below the carrier 15 and its projections 18. Two contact sections 31 arranged offset to one another by 180° project from the outer portions of the middle region 27 in the direction of the projections 18, the two contact sections 31 being configured to have different lengths corresponding to the different axial arrangement of the two free ends 17 of the sling element 12. In this case the contact sections 31 are arranged between the free ends 17 and the projections 18, in the receiving pockets 16 of the carrier.

Figure 7:
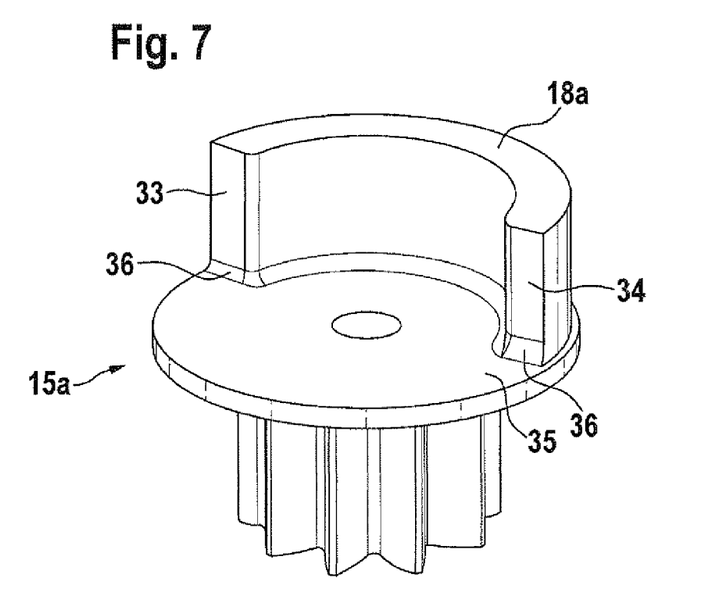
FIG. 7 shows a modified carrier in a perspective view.

FIG. 7 shows a modified carrier 15a. The carrier 15a has means for reducing the bending stresses resulting from the forces induced by the free ends 17 of the sling element 12 in the carrier 15a. These means consist in a particular geometrical configuration of the carrier 15a.

To this effect the carrier 15a has a modified projection 18a which, viewed in a plane transverse to the longitudinal direction of the carrier 15a, occupies an angular range of at least 10°, in particular from 30° to 120°, and up to the approximately 180° illustrated. In this case the angular range referred to is arrived at according to the stress or the forces to be transmitted and, inter alia, as a function of the material used. What is essential to the carrier 15a is that the two end faces 33, 34 delimiting the projection 18a serve as mating or abutment faces for the two free ends 17 of the sling element 12. As a result of the usually wider configuration of the projection 18a as compared to the projections 18, in particular the bending stress of the projection 18a on the base 35 of the carrier 15a is reduced. In addition, it may preferably be provided for this purpose that a radius 36 is formed at least in the respective transitional regions between the base 35 and the end faces 33, 34, which radius 36 further reduces the bending stress or the notch effect.

Figure 8:
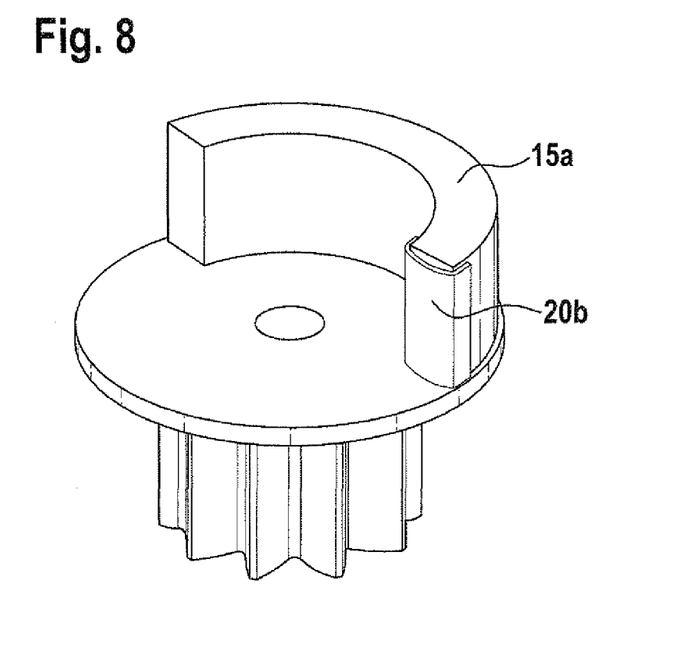
FIG. 8 shows the carrier according to FIG. 7 with an additional metal element, also in a perspective view.

FIG. 8 shows the carrier 15a interacting additionally with a metal element 20b which corresponds substantially to the metal element 20 represented in FIGS. 2 to 4.

Figure 9:
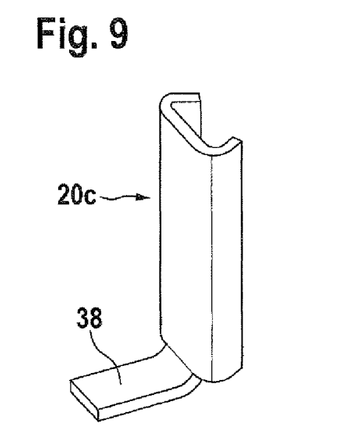
FIG. 9 shows a further modified metal element with a support section in a perspective representation.
Figure 10:
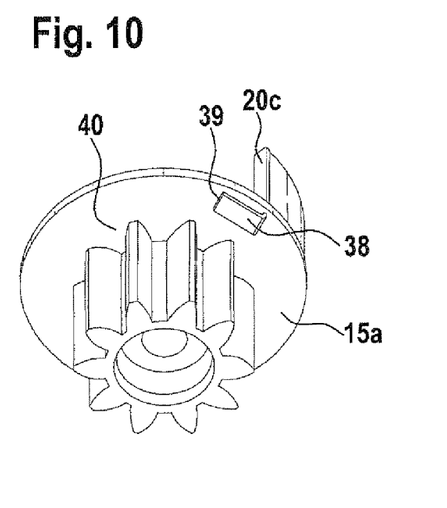
FIG. 10 shows the metal element according to FIG. 10 when installed on the carrier, in a perspective view.

FIGS. 9 and 10 show a modified metal element 20c for use on the carrier 15a (alternatively, an insert on the carrier 15 is also possible for this purpose). In this case the metal element 20c has an additional support section 38 which passes through an opening 39 formed in the carrier 15a and rests against the underside 40 of the carrier 15a. A bending moment transmitted by the free end 17 of the sling element 12 is thereby transmitted via the support section 38 to the carrier 15a, at least partially unloading the projection 18a.

Figure 11:
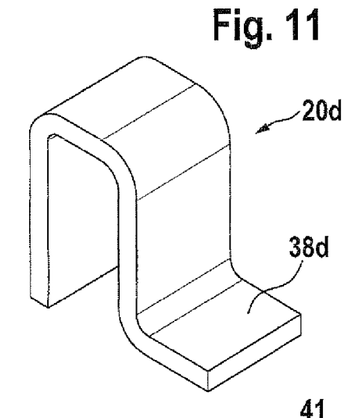
FIG. 11 shows a further modified metal element with a support section in a perspective representation.
Figure 12:
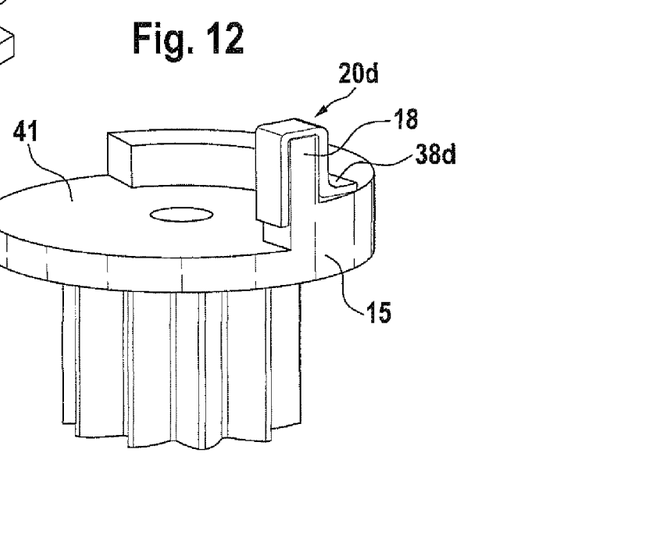
FIG. 12 shows the metal element according to FIG. 11 when installed on the carrier, in a perspective view.

FIGS. 11 and 12 show a modified metal element 20d for use on the carrier 15. In this case the metal element 20d has an arched configuration and encompasses the projection 18 of the carrier 15. In addition, the metal element 20d has on the side opposite the contact region 25 a support section 38d which rests against the upper side 41 of the carrier 15.

Figure 13:
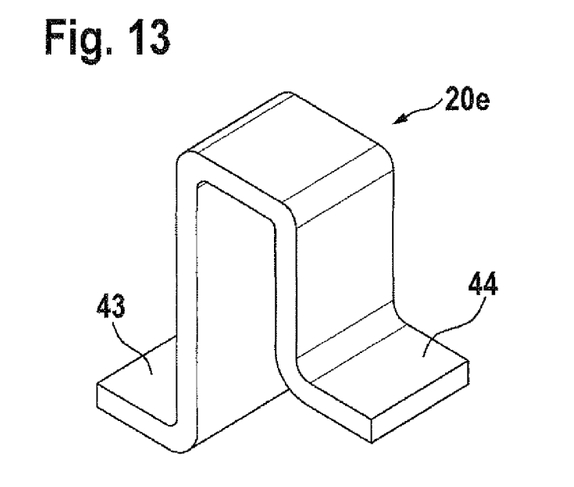
FIG. 13 shows a further modified metal element with a support section in a perspective representation.
Figure 14:
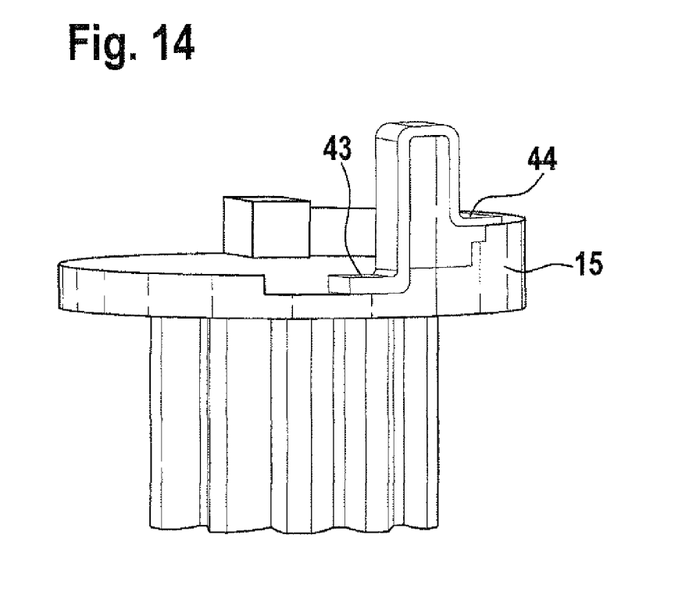
FIG. 14 shows a metal element according to FIG. 13 when installed on the carrier, in a perspective view.

The modified metal element 20e for the carrier 15 shown in FIGS. 13 and 14 represents a combination of the metal elements 20c and 20d. To this end the metal element 20e has two support regions 43, 44 arranged on opposite sides, which interact with the upper and lower sides of the carrier 15 respectively.

It will be mentioned additionally that the metal elements 20, 20a to 20e are produced, in particular, from sheet metal as punched and bent parts. Furthermore, it may be provided in the case of the metal elements 20c, 20d, 20e that the support sections 38, 38d, 43, 44 are also enclosed by the plastics material of the carrier 15, 15a. The metal elements 20c, 20d, 20e are thereby additionally anchored in the carrier 15, 15a, so that additional measures for retaining them on the carrier 15, 15a may optionally be dispensed with.

The invention claimed is:

1. A load torque lock (1) comprising: a sling element (12) which interacts frictionally with a brake component (13) for blocking a torque, and a drive wheel (14) which is coupled in a torque transmitting manner to a carrier (15; 15a), which carrier (15; 15a) engages axially in the drive wheel (14) and has at least one contact region (25) to the sling element (12), by means of which carrier (15; 15a) a torque to be blocked can be induced in the sling element (12), characterized in that the contact region (25) is formed by a metal element (20, 20a to 20e) arranged on a plastic portion (24) of the carrier (15; 15a) for reducing a bending stress in the at least one contact region (25).

2. The load torque lock as claimed in claim 1, characterized in that the carrier (15; 15a) is formed entirely from plastic material except for the at least one metal element (20, 20a to 20e) forming the at least one contact region (25).

3. The load torque lock as claimed in claim 2, characterized in that the metal element (20, 20a to 20e) is clipped to the plastic portion (24).

4. The load torque lock as claimed in claim 2, characterized in that the carrier (15; 15a) is formed as a plastic injection molded part.

5. The load torque lock as claimed in claim 1, characterized in that the metal element (20, 20a to 20e) is configured as one of a shell and a pot at least partially enclosing the plastic portion (24).

6. The load torque lock as claimed in claim 5, characterized in that the metal element (20c; 20d; 20e) has at least one support section (38; 38d; 43, 44) arranged perpendicularly to the contact region (25), which support section (38; 38d; 43, 44) is one of embedded in the carrier (15; 15a) and bearing against a surface of the carrier (15; 15a).

7. The load torque lock as claimed in claim 1, characterized in that the metal element (20a) is mounted rotatably on a bearing pin (30) for the carrier (15), and in that the metal element (20a) has at least one contact section (31) arranged parallel to an axis of the bearing pin (30), which contact section (31) interacts with the at least one contact region (25) of the carrier (15).

8. The load torque lock as claimed in claim 7, characterized in that the metal element (20a) has a middle region (27) with outer portions on which a respective contact section (31) is arranged.

9. The load torque lock as claimed in claim 8, characterized in that the middle region (27) is arranged in a plane below the carrier (15).

10. The load torque lock as claimed in claim 1, characterized in that the metal element (20; 20a to 20e) is in the form of a punched and bent part.

11. The load torque lock as claimed in claim 1, characterized in that end faces (33, 34) acting as contact faces are arranged on a projection (18a) of the carrier (15a), and in that a radius (36) is formed in a transitional region between the end faces (33, 34) and a base (35) of the carrier (15a), at least on a side of the end faces (33, 34).

12. The load torque lock as claimed in claim 11, characterized in that the projection (18a) occupies an angular range of at least 10°, viewed transversely to a longitudinal axis of the carrier (15a).

13. The load torque lock as claimed in claim 1, characterized in that the sling element (12) is in the form of one of a sling spring, a sling link chain, a sling strap, and a sling cable.

* * * * *